(12) United States Patent
Han et al.

(10) Patent No.: US 8,873,649 B2
(45) Date of Patent: Oct. 28, 2014

(54) METHOD AND APPARATUS FOR GENERATING CODE SEQUENCE IN A COMMUNICATION SYSTEM

(75) Inventors: Seung Hee Han, Seoul (KR); Min Seok Noh, Seoul (KR); Yeong Hyeon Kwon, Suwon-si (KR)

(73) Assignee: LG Electronics Inc., Seoul (KR)

( * ) Notice: Subject to any disclaimer, the term of this patent is extended or adjusted under 35 U.S.C. 154(b) by 1342 days.

(21) Appl. No.: 12/298,488

(22) PCT Filed: Apr. 30, 2007

(86) PCT No.: PCT/KR2007/002117
§ 371 (c)(1),
(2), (4) Date: May 11, 2009

(87) PCT Pub. No.: WO2007/126280
PCT Pub. Date: Nov. 8, 2007

(65) Prior Publication Data
US 2009/0323855 A1    Dec. 31, 2009

(30) Foreign Application Priority Data

May 1, 2006 (KR) .......... 10-2006-0039338
Aug. 11, 2006 (KR) .......... 10-2006-0076146
Aug. 14, 2006 (KR) .......... 10-2006-0076813

(51) Int. Cl.
*H04K 1/10* (2006.01)
*H04L 27/28* (2006.01)
*H04J 13/10* (2011.01)
*H04J 13/00* (2011.01)

(52) U.S. Cl.
CPC .......... *H04J 13/0059* (2013.01); *H04J 13/107* (2013.01)
USPC .............................. 375/260; 370/464; 455/59

(58) Field of Classification Search
USPC ......................................................... 375/299
See application file for complete search history.

(56) References Cited

U.S. PATENT DOCUMENTS

| | | | |
|---|---|---|---|
| 6,724,838 B2 * | 4/2004 | Wei-Ku et al. | 375/343 |
| 7,646,283 B2 * | 1/2010 | Wilcox | 340/5.61 |
| 7,808,886 B2 * | 10/2010 | McCoy | 370/210 |
| 2001/0025361 A1 * | 9/2001 | Kim | 714/786 |
| 2004/0085946 A1 * | 5/2004 | Morita et al. | 370/342 |
| 2004/0160934 A1 * | 8/2004 | Back | 370/342 |
| 2004/0170157 A1 | 9/2004 | Kim et al. | |
| 2010/0091907 A1 * | 4/2010 | Noh et al. | 375/302 |
| 2010/0329189 A1 * | 12/2010 | Tsuboi et al. | 370/328 |

FOREIGN PATENT DOCUMENTS

GB    2 350 037 A    11/2000
WO   WO-2006/015108 A2    2/2006

* cited by examiner

*Primary Examiner* — Shuwang Liu
*Assistant Examiner* — Gina McKie
(74) *Attorney, Agent, or Firm* — Birch, Stewart, Kolasch & Birch, LLP

(57) ABSTRACT

Disclosed are a method for generating a code sequence that can be used for acquisition of initial synchronization, cell detection, channel estimation, etc. in a mobile communication system, and a transmitter. A method for generating a code sequence in a transmitting side of a mobile communication system includes combining at least two code sequences with each other, and converting a code sequence generated by the combining step into a time domain signal.

20 Claims, 11 Drawing Sheets

METHOD AND APPARATUS FOR GENERATING CODE SEQUENCE IN A COMMUNICATION SYSTEM

TECHNICAL FIELD

The present invention relates to a mobile communication system, and more particularly, to a method for generating a code sequence in a mobile communication system and a method and apparatus for processing data for transmission of the code sequence.

BACKGROUND ART

A pilot signal or preamble, which is used in a mobile communication system, means a reference signal used for acquisition of initial synchronization, cell detection, channel estimation, etc. An orthogonal or quasi-orthogonal code having good correlation properties may be used as a code sequence which constitutes the preamble.

For example, in case of PI (Portable Internet, Specifications for 2.3 GHz band Portable Internet Service—Physical Layer), 127 sequences excluding one of which components are all 1 are inserted in a frequency domain by using 128×128 Hadamard matrix.

A CAZAC (Constant Amplitude Zero Auto-Correlation) sequence is mainly characterized in that its amplitude is uniform and autocorrelation is represented by a delta function type. However, cross correlation of the CAZAC sequence, although not zero, has a small value. GCL CAZAC sequence and zadoff CAZAC sequence, which are mainly used as the CAZAC sequences, are very similar to each other and have different orientations in phase.

First, the GCL CAZAC sequence is given by the following Equations 1 and 2.

$$c(k; N, M) = \exp\left(-\frac{j\pi Mk(k+1)}{N}\right) \quad \text{[Equation 1]}$$

(in case where $N$ is an odd number)

$$c(k; N, M) = \exp\left(-\frac{j\pi Mk^2}{N}\right) \quad \text{[Equation 2]}$$

(in case where $N$ is an even number)

The Zadoff CAZAC sequence can be expressed by the following Equations 3 and 4.

$$c(k; N, M) = \exp\left(\frac{j\pi Mk(k+1)}{N}\right) \quad \text{[Equation 3]}$$

(in case where $N$ is an odd number)

$$c(k; N, M) = \exp\left(\frac{j\pi Mk^2}{N}\right) \quad \text{[Equation 4]}$$

(in case where $N$ is an even number)

In the Equations 1 to 4, N is a length of the sequence, M is a natural number which is relatively prime to N among natural numbers less than N, and k represents 0, 1, . . . , N.

Binary Hadamard codes or poly-phase CAZAC codes are orthogonal codes, and the number of the binary Hadamard codes or the poly-phase CAZAC codes, which maintains orthogonality, is limited. The number of orthogonal codes having a length of N, which can be obtained by N×N Hadamard matrix, is N, and the number of orthogonal codes having a length of N, which can be obtained by CAZAC code is equivalent to the number of natural numbers less than N, wherein the natural numbers are relatively prime to N. [David C. Chu, "Polyphase Codes with Good Periodic Correlation Propertie", *Information Theory IEEE Transaction on*, vol. 18, issue 4, pp. 531-532, July, 1972]

For example, the length of one OFDM (Orthogonal Frequency Division Multiplexing) symbol in an OFDM system generally has a length of exponentiation of 2 to expedite FFT (Fast Fourier Transform) and IFFT (Inverse Fast Fourier Transform). In this case, if the sequence is generated by the Hadamard code, sequence types equivalent to the total length may be generated. If the sequence is generated by the CAZAC code, sequence types equivalent to N/2 may be generated. For this reason, a problem occurs in that there is limitation in the number of the sequence types.

DISCLOSURE OF THE INVENTION

Accordingly, the present invention is directed to a method and apparatus for generating a code sequence that can be used for acquisition of initial synchronization, cell detection, channel estimation, etc in a communication system and a method of data-processing for transmission of the code sequence, which substantially obviate one or more problems due to limitations and disadvantages of the related art.

An object of the present invention is to provide a method and apparatus for extending a range of code sequences that can be used in a communication system.

Another object of the present invention is to provide a method and apparatus of data-processing to generate a code sequence that can enhance efficiency in acquisition of initial synchronization, cell detection, or channel estimation in a communication system.

For example, if a CAZAC code which has a length of N is generated, maximum (N−1) types of code sequences are available. According, to increase the number of the code sequences, it is preferable to increase the length of the code sequences. However, the code sequences are actually determined at a short length considering bandwidth efficiency of a mobile communication system. To transmit much information at the same code length, a method for generating various kinds of code sequences with the same length is needed. Particularly, a method which is robust to a multi-path widely occurring in a radio channel and can sufficiently use frequency diversity effect is needed.

One aspect of the present invention is a method of generating various kinds of code sequences by combining at least two different code sequences to generate a new code sequence. In other words, according to one feature of the present invention, at least two code sequences are combined with each other to generate one code sequence. The following Equation 5 illustrates one example that at least two code sequences are combined with each other to generate one code sequence.

$$d(k; \tau_1, \tau_2, \ldots, \tau_L, M_1, M_2, \ldots, M_L, N) = \sum_{i=1}^{L} \lambda_i c(k - \tau_i; M_i, N) \quad \text{[Equation 5]}$$

In Equation 5, $\lambda_i$ is a power control constant for the $i^{th}$ code sequence, $\tau_i$ is a delay component of each code sequence, and $M_1$ is a sequence key of the $i^{th}$ code sequence.

The at least two code sequences are combined with each other by adding up of corresponding elements of the at least two code sequences, so as to generate one code sequence. Alternatively, the at least two code sequences may serially be concatenated to generate one code sequence. Examples of a code to which technical features of the present invention can be applied include, but not limited to, a binary code, a Hadamard code, and a poly-phase CAZAC code.

In one aspect of the present invention, a method for generating a code sequence in a transmitting side of a mobile communication system comprises combining at least two code sequences to generate a new code sequence, and transforming the new code sequence into time domain signals.

In another aspect of the present invention, a transmitter for generating a code sequence in a mobile communication system comprises a sequence combiner combining at least two code sequences to generate a new code sequence, and a time domain signal transforming module transforming the new code sequence generated by the sequence combiner into time domain signals.

In still another aspect of the present invention, a method a method of data-processing for transmission of a code sequence from a transmitting side to its receiving side in a mobile communication system comprises mapping a first code sequence to a first part of sub-carriers belonging to a whole band used in the mobile communication system, mapping a second code sequence to a second part of sub-carriers belonging to the whole band, and transforming the first and second code sequences mapped to the sub-carriers into time domain signals.

In further still another aspect of the present invention, a method of data-processing for transmission of a code sequence from a transmitting side to its receiving side in a mobile communication system comprises generating a new code sequence by serially concatenating at least two code sequences, mapping the generated code sequence to at least a part of sub-carriers belonging to a whole band used in the mobile communication system, transforming the code sequence mapped to the sub-carriers into time domain signals.

In further still another aspect of the present invention, a method of data-processing for transmission of a code sequence from a transmitting side to its receiving side of a mobile communication system comprises converting at least one code sequence into time domain signals, generating at least two different code sequences by performing circular shift for the at least one code sequence converted into the time domain signals, and combining the at least two code sequences generated by the circular shift.

In further still another aspect of the present invention, a transmitter for generating a code sequence for transmission to a receiving side in a communication system, comprises an IFFT module transforming at least one code sequence into time domain signals, a circular shift module generating at least two different code sequences by performing circular shift for the at least one code sequence converted into the time domain signals, a combiner combining the at least two code sequences generated by the circular shift.

BEST MODE FOR CARRYING OUT THE INVENTION

Hereinafter, structures, operations, and other features of the present invention will be understood readily by the preferred embodiments of the present invention, examples of which are illustrated in the accompanying drawings.

Figure 1:
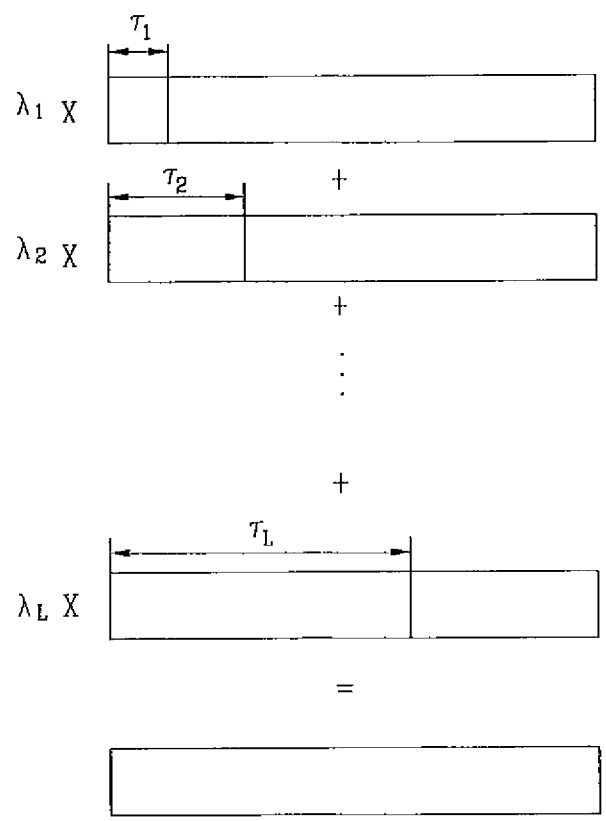
FIG. 1 is a diagram illustrating a preferred embodiment of the present invention.

FIG. 1 is a diagram illustrating the preferred embodiment of the present invention. Referring to FIG. 1, an $L^{th}$ CAZAC sequence is obtained in such a manner that an optional CAZAC sequence, for example, a sequence generated by any one of the Equations 1 to 4 is circular shifted by $\tau_L$. In this case, circular shift means that delay occurs in the CAZAC sequence to shift the order of elements. For example, when a code sequence consisting of five elements of A, B, C, D, E is circular shifted by $\tau_L=2$, a code sequence having the order of C, D, E, A, B is generated. Although the CAZAC sequence generated by circular shift has orthogonality with the original sequence before circular shift, a peak is generated by cross correlation.

The original CAZAC sequences from which the first to $L^{th}$ CAZAC sequences are generated by the circular shift, may be the same sequences as one another or different sequences. In other words, after one CAZAC sequence is circular shifted to generate at least two different CAZAC sequences, the generated CAZAC sequences may be summed up each other to generate a new sequence. After each of at least two CAZAC sequences is circular shifted, the two CAZAC sequences may be summed up each other to generate a new sequence. If at least two different CAZAC sequences are summed up each other, they may not undergo circular shift. Summing up at least two different CAZAC sequences means combining corresponding elements of the sequences.

Figure 2A:
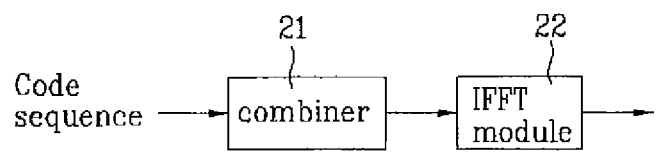
FIGS. 2A and 2B diagrams illustrating examples of hardware configuration for embodiments in accordance with the present invention.

FIG. 2A is a block diagram illustrating a transmitter according to the preferred embodiment of the present invention. Referring to FIG. 2A, at least two different code sequences which have not undergone circular shift are combined with each other to generate a new code sequence. The transmitter of FIG. 2A includes a combiner 21 and an IFFT module 22. The combiner 21 receives at least two code sequences and combines respective elements of the code sequences with each other. The IFFT module 22 maps the code sequences generated by the combiner 21 to sub-carriers, and performs IFFT to convert the mapped result into time domain signals. The combiner 21 may generate one code sequence by adding up corresponding elements of the at least two code sequences. Alternatively, the combiner 21 may generate one code sequence by serially concatenating the at least code sequences. The at least two code sequences could be binary codes, Hadamard codes, or poly-phase CAZAC codes.

In the case that the at least two code sequences are serially concatenated to generate one code sequence, combining step by means of the combiner 21 is omitted, any one of the code sequences is mapped to a part of sub-carriers belonging to the whole band, and the other code sequence is mapped to other part of sub-carriers belonging to the whole band. Afterwards, IFFT is performed for the whole code sequences mapped to the sub-carriers, whereby the same result can be obtained.

Figure 2B:
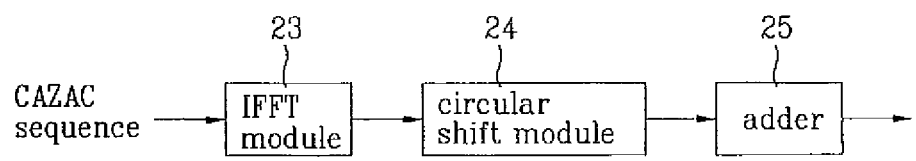

FIG. 2B is a block diagram illustrating another transmitter according to the preferred embodiment of the present invention.

Referring to FIG. 2B, at least two different CAZAC sequences which have undergone circular shift are combined with each other to generate a new CAZAC sequence. The transmitter of FIG. 2B includes an IFFT module 23, a circular shift module 24, and an adder 25. The IFFT module 23 receives at least one CAZAC sequence and converts the CAZAC sequence into time domain symbols. The circular shift module 24 circular shifts the at least one CAZAC sequence converted into the time domain symbols to generate at least two different CAZAC sequences. The adder 25 adds the at least two different CAZAC sequences output from the circular shift module 24 to each other so as to generate a new CAZAC sequence.

Although the embodiment of FIG. 2B illustrates the example that the CAZAC sequences are circular shifted in a time domain, the CAZAC sequences may be circular shifted before IFFT, i.e., in a frequency domain to generate a plurality of CAZAC sequences. In this case, at least one CAZAC sequence is circular shifted before IFFT to generate at least two CAZAC sequences, and the generated CAZAC sequences are combined with each other to generate a new CAZAC sequence, whereby the generated new CAZAC sequence is converted into a time domain signal by IFFT.

In the Equation 5, $\lambda_i$ is a power control constant for the $i^{th}$ CAZAC sequence, and is to allow a new sequence generated by combination of at least two CAZAC sequences to perform normalization, thereby allowing each element to obtain amplitude of 1. Two methods for normalization can be considered. The first method is that each element of the generated sequences is divided by an absolute value of each element. The second method is that the overall power of the generated sequences is adapted to the number N of the elements.

Figure 3:
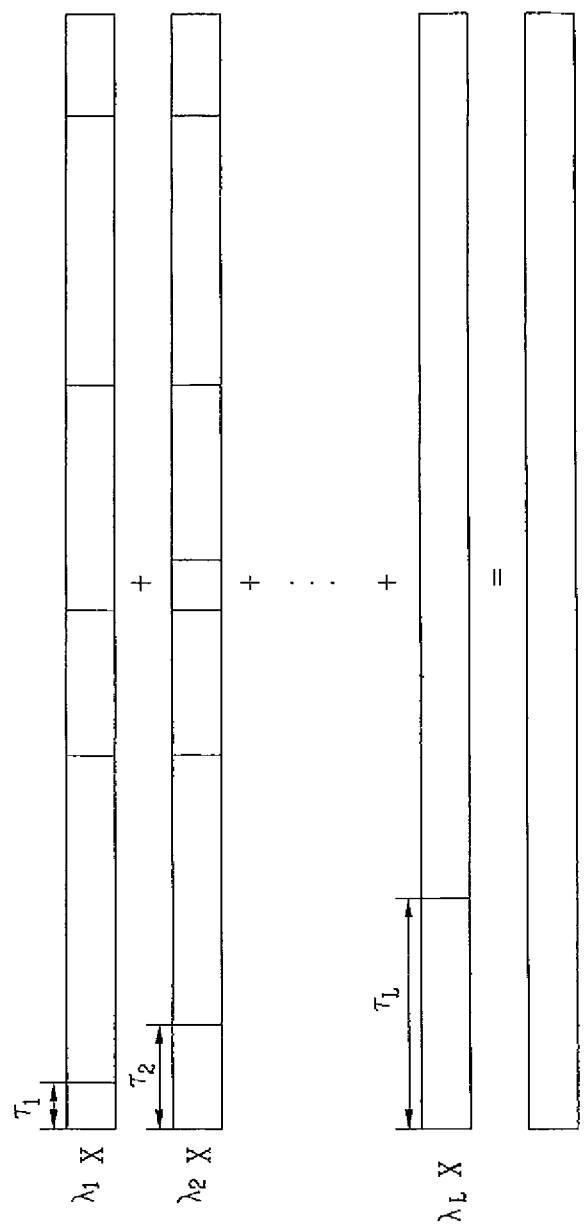
FIG. 3 is a diagram illustrating another preferred embodiment of the present invention.

FIG. 3 is a diagram illustrating another preferred embodiment of the present invention. Referring to FIG. 3, at least two code sequences are combined with each other to generate one code sequence. If the at least two code sequences combined with each other have different lengths, the respective code sequences are combined with each other in such a manner that their lengths are adapted to the that of the longest code sequence to allow the other code sequences except the longest code sequence to have repeated patterns. Examples of a method for combining at least two code sequences with each other include a method of adding up corresponding elements and a method of serially concatenating code sequences having different patterns. The method for adding up corresponding elements of at least two code sequences to generate one code sequence can be expressed by the following Equation 6.

$$d(k; \tau_1, \tau_2, \ldots, \tau_L, M_1, M_2, \ldots, M_L, N_1, N_2, \ldots, N_L) = \sum_{i=1}^{L} \lambda_i c(k - \tau_i; M_i, N_i)$$ [Equation 6]

According to combination which represents the code generated as expressed by the Equation 5 or 6, $(\tau_1, \tau_2, \ldots, \tau_L, M_1, M_2, \ldots, M_L)$ and code types having diversity of $N^{2L}$ are generated. In this case, although the present invention is intended to sufficiently increase codes, if many codes are combined with one another, a receiving side may suffer difficulty in finding each code due to cross correlation. Particularly, if delay occurs due to circular shift, a method for stably estimating such delay is needed. To this end, supposing that $\tau_1=0$ is obtained, relative position for delay of each sequence can be identified. Accordingly, the method can be used even in case that a start position of the code is unclear. In order that combination of keys in delay and code which are detected can be mapped with a coordinate value of 2L dimension one to one, the relative position of delay, i.e., a coordinate position of the code key should be identified to enable such 1:1 mapping. To this end, a limited condition is preferably required for delay of each code sequence as expressed by the following Equation 7.

$$\tau_i \leq \tau_j, i < j$$ [Equation 7]

According to the condition of the Equation 7, although the number of codes that can be generated is decreased to reach less than $N^{2L}$, the order of $N^{2L}$ is maintained. Accordingly, a coordinate value mapped with the code one to one can be identified, wherein the code is generated by adding at least two code sequences to each other. From the identified coordinate value, various kinds of information can be transferred or signal can be identified.

Figure 4:
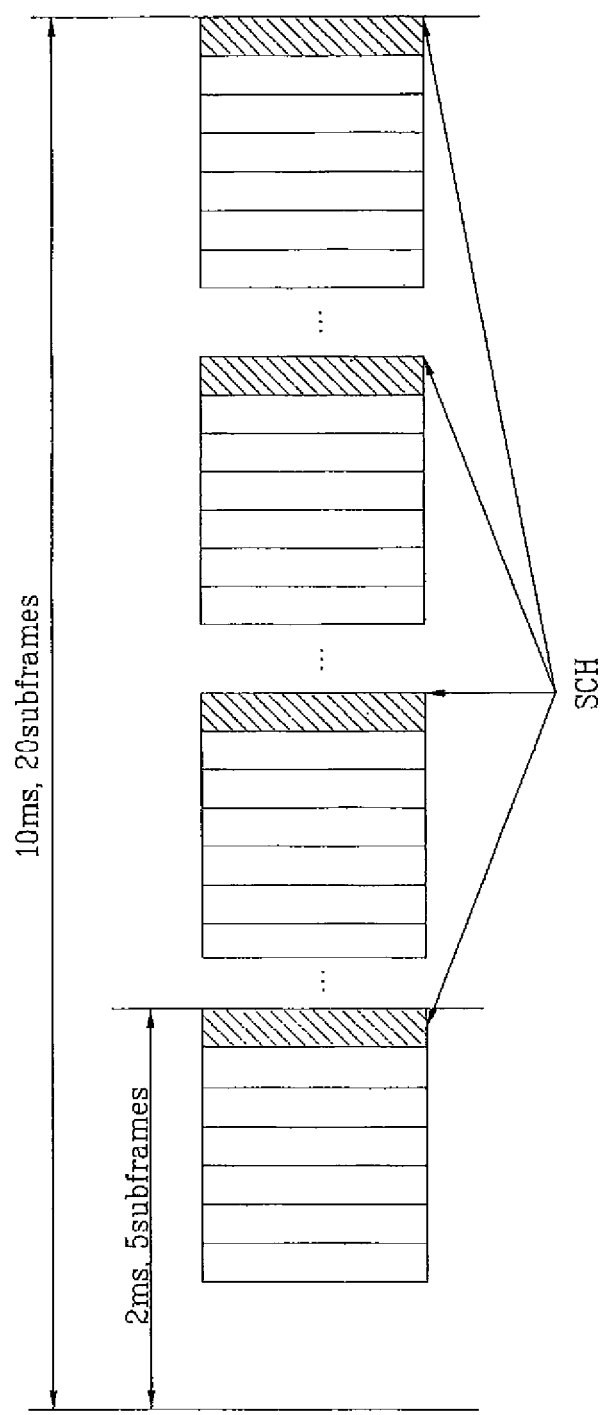
FIG. 4 is a diagram illustrating another preferred embodiment of the present invention.

FIG. 4 is a diagram illustrating another preferred embodiment of the present invention. Referring to FIG. 4, one sequence code generated by combination of at least two CAZAC sequences is applied to a synchronization channel (SCH). Although this one sequence code may equally be applied a random access channel (RACH), a code expression value may differently be interpreted.

The embodiment of FIG. 4 corresponds to the case of L=2 of the code combination of FIG. 1. In other words, an expression value of the code is $(\tau_1, \tau_2, M_1, M_2)$, wherein $\tau_1=0$ is obtained, and $M_1$ is set as a key value of a code that will be used in common. In other words, two degrees of freedom are decreased from the above limitation, so that the code expression value may be expressed simply by $(\tau_2, M_2)$ This means that the amount of the codes increases through a delay value of the second code and a key value of the code. Supposing that every sample delay can occur, (N−1)×(N−1) code combinations which are a total number of available cases are generated.

In FIG. 4, it is supposed that four synchronization channels (SCH) exist in an interval of 20 ms and the same code is transmitted to each channel. The synchronization channels (SCH) are used for acquisition of time synchronization from a receiving signal of a receiving side, acquisition of overall frame synchronization after time synchronization, and acquisition of cell identifier (cell ID) or cell group ID and other secondary information. This will now be described briefly.

1) Time synchronization: various methods can be used for time synchronization. For example, a method for transmitting a code to the SCH may be used. According to this method, a transmitting side transmits a code symbol to all the subcarriers while a receiving side obtains direct cross correlation between transmitting and receiving signals. Alternatively, if the transmitting side does not transmit the code symbol to all the sub-carriers but transmit the code symbol at an interval of two sub-carriers or greater, the signals represent periodicity in a time domain. Accordingly, based on this feature, a method for processing auto correlation of a receiving signal at a receiving side and searching for a peak may be used.

Of the above two methods, the method for transmitting a symbol to all the sub-carriers has better performance. If the code sequence according to the present invention is transmitted, it can be applied to the above two cases. If the cross correlation method is used, a common code $M_1$ is used to obtain a correlation value. Since $M_1$ and other sequence added to $M_1$ are separate codes from each other, they are distinguishable from each other. If it is difficult to search for the sequences using one SCH, the SCHs within different superframes (interval of 20 ms) can be added to adapt synchronization.

2) Frame synchronization: since it is necessary to identify in what position each SCH exists, if SCHs are arranged at constant intervals, they are distinguishable through position information of the sequences included in each SCH or in such a manner that secondary-SCH (S-SCH) is additionally arranged next to the SCHs. If the code sequence according to the present invention is used, the position of each SCH can be identified by delay. In case of the RACH, other information which an access terminal desires can be transmitted along with the RACH.

3) Detection of Cell-ID: detection of Cell ID should be obtained from SCH signals. Since information of the code $M_1$ has been identified during time synchronization, $M_1$ is removed from the receiving signal, and other signals can be identified easily by using phase differential incremental difference between successive code samples of the CAZAC sequence. In case of the RACH, various kinds of control information can be transmitted along with the RACH.

Figure 5:
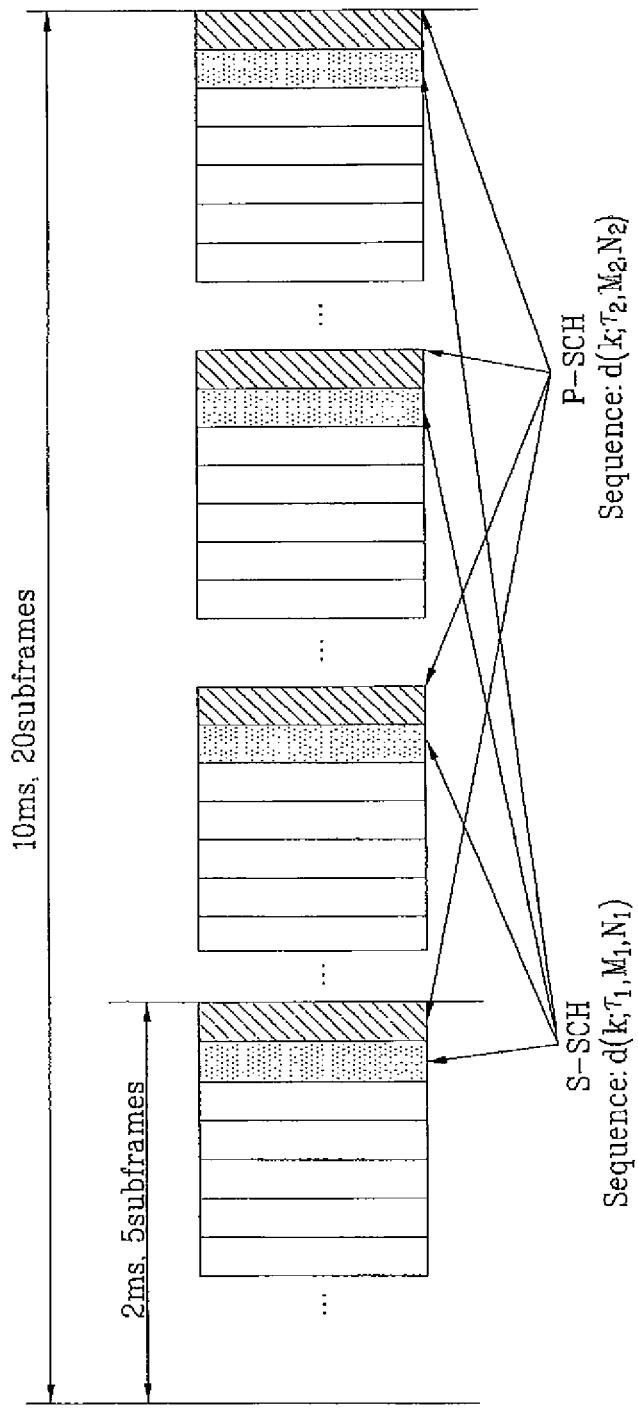
FIG. 5 is a diagram illustrating another preferred embodiment of the present invention.

FIG. 5 is a diagram illustrating another preferred embodiment of the present invention. The embodiment described with reference to FIG. 5 is applied to the case where a channel structure is a hierarchical structure. Referring to FIG. 5, a sub-frame of 2 ms hierarchically includes two synchronization channels, i.e., a primary synchronization channel (P-SCH) and a secondary synchronization channel (S-SCH).

In FIG. 5, the primary synchronization channel (P-SCH) exists to search for time synchronization of a symbol, and the same code sequence can be used in every cell. Although a value greater than 1 can be used as a value of L, the case L=1 is shown in FIG. 5. A code sequence for transmission of cell information for cell detection at the receiving side is used for the secondary synchronization channel (S-SCH). At this time, the code generated in accordance with the preferred embodiment of the present invention can be used. Preferably, many kinds of codes can be used in the secondary synchronization channel (S-SCH) if possible. In this case, the value of L may be greater than 1. In case of L=1, one code key (value of M) is associated with the cell, and much more kinds of information can be transferred depending on the delay value. If the value of L is greater than 1, information corresponding to L times of the case where the value of L is equal to 1 can be transferred.

Figure 6:
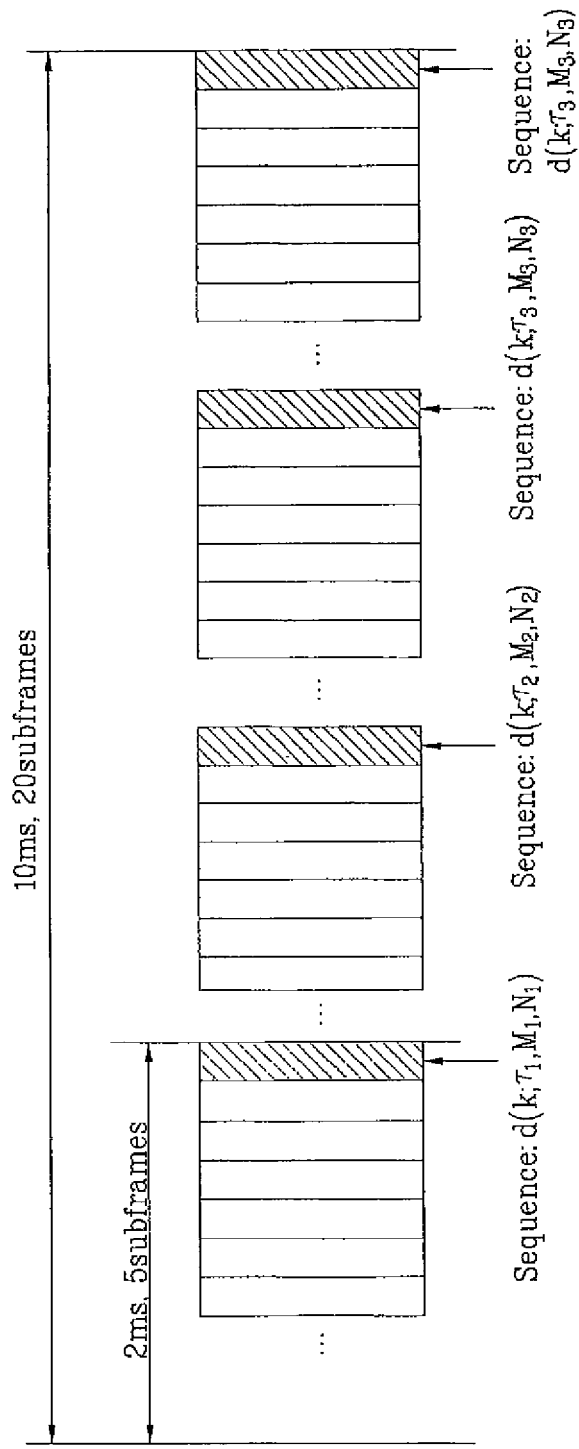
FIG. 6 is a diagram illustrating another preferred embodiment of the present invention.

FIG. 6 is a view illustrating another preferred embodiment of the present invention. The embodiment described with reference to FIG. 6 is applied to the case where a channel structure is a non-hierarchical structure.

The code according to the preferred embodiment of the present invention can be applied to each of synchronization symbols, and 1 or a value greater than 1 can be applied to the value of L. Furthermore, application of the code sequence generated by the Equation 6 enables that the code can be embedded over several synchronization channels, wherein combination of a long code sequence and a short code sequence may depend on the value of L. Referring to FIG. 6, when synchronization codes are inserted into the synchronization channels, four synchronization symbols may have different delays for the same code sequence or the same delay for different code sequence. Alternatively, synchronization symbols may be grouped (the size of the group is greater than 1), so that each group may have the same sequence. Accordingly, information provided by the synchronization channels is represented by combination of the key value M of the code and the delay value, and is characterized in that the information amount becomes L times if L increases.

As another preferred embodiment of the present invention, cell detection sequence employing the present invention will be described. The embodiment described hereinafter illustrates that technical features of the present invention are applied to a hierarchical structure and a non-hierarchical structure, which are discussed as structures of the synchronization channels in 3GPP LTE (Long Term Evolution). Furthermore, although the embodiment based on the GCL CAZAC code will be described hereinafter, since the Zadoff-Chu CAZAC sequence is different from the GCL code in symbol component of phase, its application will be the same as that of the GCL code. Likewise, application of other based CAZAC sequence will be the same as that of the GLC code.

Furthermore, the embodiment described hereinafter corresponds to the case L=1 and will be applied to the OFDM system. Accordingly, the embodiment described hereinafter will be based on circular shift after the GCL CAZAC code is generated and then undergoes IFFT. In this regard, the embodiment does not follow the expression method of the above equation but employs another notation.

First of all, an example of cell ID detection or cell group ID detection through the S-SCH in the hierarchical structure will be described. The SCH in the hierarchical structure includes P-SCH and S-SCH. The P-SCH is a channel where all the cells transmit the same signal, through which initial synchronization can be acquired. The S-SCH transmits information of cell-specific ID or cell group ID for each cell and also transmits secondary information required for acquisition of frame synchronization and other information. The secondary information required for acquisition of frame synchronization and the other information may be transmitted through a broadcast channel (BCH). Examples of a multiplexing method of the P-SCH and the S-SCH include TDM (Time Division Multiplexing), FDM (Frequency Division Multiplexing), and CDM (Code Division Multiplexing) depending on time, frequency, and code domains. The hierarchical structure shown in FIG. 5 corresponds to the case where multiplexing of the P-SCH and the S-SCH is TDM. Hereinafter, an example of TDM will be described for convenience.

The P-SCH can be provided by insertion of the GCL CAZAC code or another optional code. In this case, the same code for each cell is used. Accordingly, when the code generated by the preferred embodiment of the present invention is applied to the hierarchical structure, it is preferably used for the S-SCH which transmits cell-specific information.

The code for the S-SCH selects different values of M for each cell and transmits the selected values. In this case, types of codes that can be identified for each cell are related to the length N of the code, and the number of the codes is the number of natural numbers, which are relatively prime to N among natural numbers less than N. For example, in the 3GPP LTE system, since the number of sub-carriers that can be used for synchronization channels of 1.25 MHz is 75, the number of codes that can be generated by the Equation 1 is 40 (M=1, 2, 4, 7, 8, 11, 13, 14, 16, 17, 19, 22, 23, 26, 28, 29, 31, 32, 34, 37, 38, 41, 43, 44, 46, 47, 49, 52, 53, 56, 58, 59, 61, 62, 64, 67, 68, 71, 73, 74) to generate codes with the length of N=75. Accordingly, the number of a total of cells that can be identified is 40. To increase the number of code sequences being generated with the same length, the following method may be considered. In other words, if the CAZAC sequence is generated for the case of N=79, a total of 78 code sequences are generated. At this time, if four elements are truncated from each code sequence to adjust the length of the code sequences to N=75, a total of 78 code sequences of N=75 can be generated.

Secondary information by circular shift sequence according to the preferred embodiment of the present invention can be used as information of cell ID classification, information of cell group ID classification, information of bandwidth of cell being transmitted, frame synchronization information, information of the number of transmitting antennas, bandwidth information of another channel such as BCH, and information of cyclic prefix (CP) length.

For example, if the CAZAC sequence is generated for the case of N=79 as above, a total of 78 code sequences are generated. At this time, if each code sequence is truncated to adjust the length of the code sequences to N=75 and the number of delay components by means of circular shift for each code sequence is 8, a total of 624(78×8) circular shift sequences can be obtained. In this case, supposing that 8 circular shift sequences are used for the P-SCH in the hierarchical structure, 616 circular shift sequences can be used for the S-SCH. If the circular shift sequences are used for cell ID classification or cell group ID classification, a total of 616 cells or cell groups can be identified.

If the code sequences according to the preferred embodiment of the present invention are used for cell classification, two cases can be considered as follows. In the first case, delay components according to circular shift are used as cell group ID information, and each code sequence is used as cell ID information. In the second case, each code sequence is used as cell group ID information, and delay components according to circular shift are used as cell ID information.

In the first case, since 8 delay components according to circular shift were supposed, 8 cell groups can be identified. Since the number of the code sequences is 78, 78 cells for each group can be identified. This will now be described in more detail.

Cell group ID=0 (delay group 0)
Code sequence index: 1, 2, 3, . . . , 78 (a total of 78 types)
Cell group ID=1 (delay group 1)
Code sequence index: 1, 2, 3, . . . , 78 (a total of 78 types)
Cell group ID=2 (delay group 2)
Code sequence index: 1, 2, 3, . . . , 78 (a total of 78 types)
Cell group ID=3 (delay group 3)
Code sequence index: 1, 2, 3, . . . , 78 (a total of 78 types)
Cell group ID=4 (delay group 4)
Code sequence index: 1, 2, 3, . . . , 78 (a total of 78 types)
Cell group ID=5 (delay group 5)
Code sequence index: 1, 2, 3, . . . , 78 (a total of 78 types)
Cell group ID=6 (delay group 6)
Code sequence index: 1, 2, 3, . . . , 78 (a total of 78 types)
Cell group ID=7 (delay group 7)
Code sequence index: 1, 2, 3, . . . , 78 (a total of 78 types)
{the number of a total of cell IDs: 624 types}

In the second case, 78 cell groups corresponding to the number of the code sequences can be identified, and 8 cells for each group can be identified. In both the first and second cases, a total of 624 (78×8) cells can be identified. Since one code sequence should be used for the P-SCH in the hierarchical structure, a total of 616 (77×8) cells can be identified.

To facilitate cell planning during network design, a large number of cell IDs in a physical level are preferably required if possible. Also, although all cell IDs prescribed on the standard during network design may be used, some of them may be used. Accordingly, a network designer can use the required number of cell IDs for network design through grouping. For example, supposing that there are provided a total of 624 available cell IDs and that 234 cell IDs are only required during cell design, three cell group IDs having 78 cell IDs can be used.

As another example, supposing that the number of required cell IDs is 512, 64 code sequences are respectively used for 8 cell groups. This will now be described in more detail.

Cell group ID=0 (delay group 0)
Code sequence index: 1, 2, 3, . . . , 64 (a total of 64 types)
Cell group ID=1 (delay group 1)
Code sequence index: 1, 2, 3, . . . , 64 (a total of 64 types)
Cell group ID=2 (delay group 2)
Code sequence-index: 1, 2, 3, . . . , 64 (a total of 64 types)
Cell group ID=3 (delay group 3)
Code sequence index: 1, 2, 3, . . . , 64 (a total of 64 types)
Cell group ID=4 (delay group 4)
Code sequence index: 1, 2, 3, . . . , 64 (a total of 64 types)
Cell group ID=5 (delay group 5)
Code sequence index: 1, 2, 3, . . . , 64 (a total of 64 types)
Cell group ID=6 (delay group 6)
Code sequence index: 1, 2, 3, . . . , 64 (a total of 64 types)
Cell group ID=7 (delay group 7)
Code sequence index: 1, 2, 3, . . . , 64 (a total of 64 types)
{the number of a total of cell IDs: 512 types}

Figure 7:
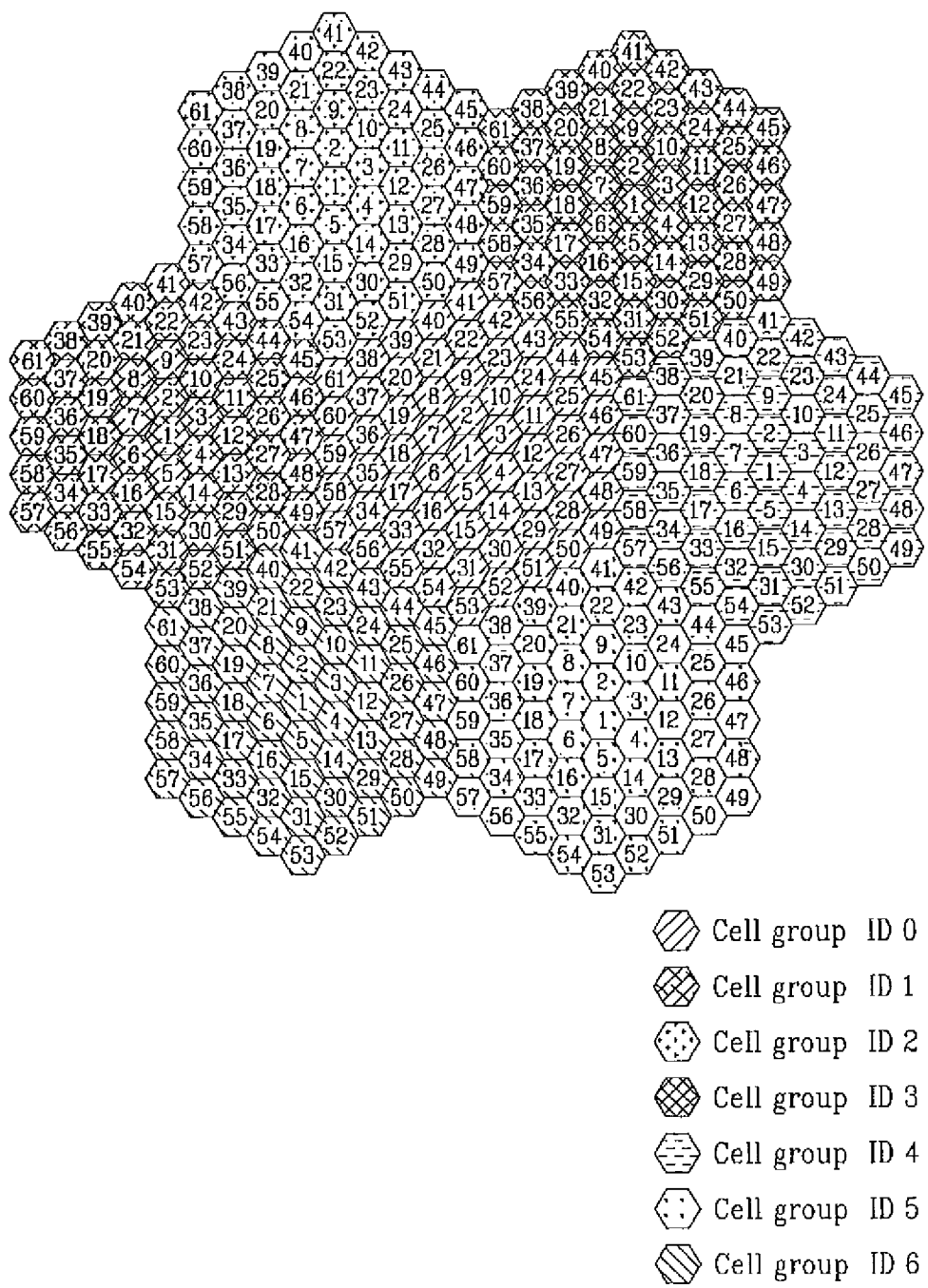
FIG. 7 is a diagram illustrating another preferred embodiment of the present invention.

FIG. 7 is a diagram illustrating another preferred embodiment of the present invention. In the embodiment of FIG. 7, when a total of 427 cell IDs are required during network design, the number of cell group IDs is 7 and the number of code sequences for each group is 61. In FIG. 7, numbers within cells represent examples of cell group IDs within each cell group. In FIG. 7, although one cell is comprised of one sector, it is apparent that one cell may be applied to other sector structure such as three sectors and six sectors.

As another example of delay components by means of circular shift according to the preferred embodiment of the present invention, the delay components by means of circular shift can be used to indicate information of the number of transmitting antennas or the length of CP. For example, the number (78) of the code sequences available by the existing sequences can be used for cell classification or cell group ID classification, and the number (8) of the delay components by means of circular shift can be used to indicate information of the case where the number of transmitting antennas is 4 and types of the CP length are 2.

Figure 8A:
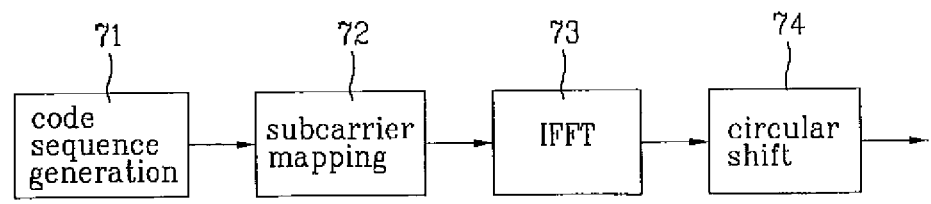
FIGS. 8A and 8B are diagrams illustrating another preferred embodiments of the present invention.
Figure 8B:
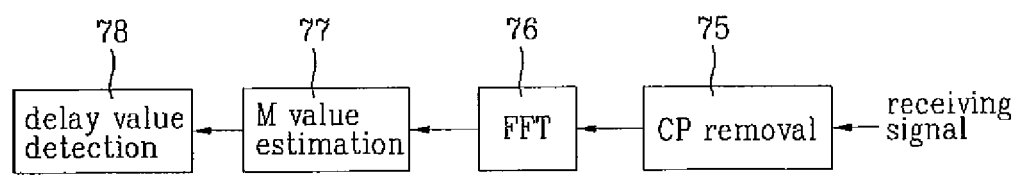

FIGS. 8A and 8B are views illustrating another preferred embodiment of the present invention. FIG. 8A is a flow chart illustrating the procedure of the transmitting side, and FIG. 8B is a flow chart illustrating the procedure of the receiving side.

Referring to FIG. 8A, the transmitting side generates the code sequences, i.e., GCL CAZAC codes (71). The transmitting side may not generate the code sequences directly but store previously generated code sequences so as to output them if necessary. The GCL CAZAC codes can be generated by the following Equation 8.

$$C^M(k) = \exp(-j\pi k(k+1)/N) \quad \text{[Equation 8]}$$

k=0, 1, ..., N−1

In the Equation 8, $C^M(k)$ is a GCL code of the $k^{th}$ element having a seed value of M. Since N which is a code length corresponds to N=75, the equation where N is an odd number has been used.

The transmitting side maps each sub-carrier to the generated code sequences (72). In this step, the transmitting side can insert guard sub-carrier and DC sub-carrier in accordance with the following Equation 9.

$$C_{guard}^M = f(C^M) \quad \text{[Equation 9]}$$

In this Equation 9, f( ) is a function which maps a complex signal equivalent to used sub-carrier to the guard sub-carrier and the DC sub-carrier for IFFT modulation.

The transmitting side performs IFFT for the code sequences mapped to the sub-carriers in accordance with the following Equation 10 to generate OFDM symbols of the time domain.

$$c^M(n) = \frac{1}{N_{fft}} \sum_{k=0}^{N_{fft}-1} \left( C_{guard}^M(k) \exp\left(j \frac{2\pi kn}{N_{fft}}\right) \right) \quad \text{[Equation 10]}$$

$k = 0, 1, 2, \ldots, N_{fft}-1$ $n = 0, 1, 2, \ldots, N_{fft}-1$

The transmitting side performs circular shift for the IFFT performed signal in accordance with the following Equation 11.

$$c_\tau^M(n) = c^M(\text{mod}(N_{fft}+n-\tau, N_{fft})) \quad \text{[Equation 11]}$$

In the Equation 11, mod(a, b) means the remainder obtained by dividing a by b. The Equation 11 means circular shift to the right. Circular shift to the left can be obtained by the following Equation 12.

$$c_\tau^M(n) = c^M(\text{mod}(N_{fft}+n+\tau, N_{fft})) \quad \text{[Equation 12]}$$

In view of the frequency domain, the signal generated by the Equation 11 is converted into a form of a phase value of each sub-carrier, which is linearly increased, as expressed by the following Equation 13.

$$C_\tau^M(k) = C_{guard}^M(k) \cdot \exp\left(-j \frac{2\pi k\tau}{N_{fft}}\right) \quad \text{[Equation 13]}$$

Although it has been described above that circular shift is performed in view of digital aspect, the signal after digital to analog (D/A) conversion may undergo circular delay. At this time, the number of samples which undergo circular shift is selected considering delay spread of a channel considered in a system which is used. Conventionally, since the CP length is designed considering such delay spread in an OFDM system, a CP interval range (exactness is not necessarily required) is considered when this step is performed.

Figure 9:
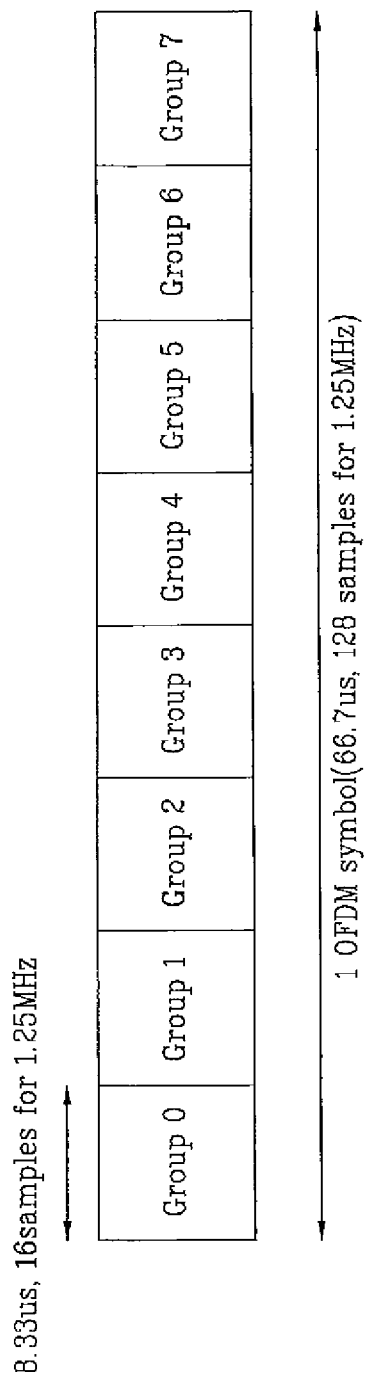
FIG. 9 is a diagram illustrating an example that values that can be used as delay components are set in accordance with the preferred embodiment of the present invention.

FIG. 9 is a diagram illustrating an example that values that can be used as delay components are set in accordance with the preferred embodiment of the present invention. In FIG. 9, 128-point IFFT is performed so that 8 groups for each of 16 samples are grouped if the number of samples of OFDM symbols except CP is 128. The reason why grouping is performed for delay is to allow the receiving side to be robust to influence of a channel and exactly receive a delay value when the receiving side detects the delay value. Currently, since the maximum delay spread length of a typical urban (TU) model which is a channel model considered by the LTE is 5 us (10 samples), 16 samples which correspond to 8.33 us cover the maximum delay spread length. Also, since the length of a short CP is 4.69 us, 5.21 us, defining 8.33 us as one group is adequate even in case that design is performed based on the length of the short CP. The receiving side can robustly estimate a delay value through a margin in spite of interference such as remaining symbol timing offset. The grouping method for grouping 8 groups for each of 16 samples with respect to the 128 symbols is only exemplary, and various numbers of groups and various numbers of samples for each group, such as 16 groups for each of 8 samples, may be defined.

Delay combination that can be obtained in this embodiment includes 8 types such as 0 us (0 sample), 8.330 us (16 samples), 16.66 us (32 samples), ..., 58.31 us (112 samples). Although it has been described that 128-point IFFT is performed, other-point (256, 512, 1024, 1536, 2048) IFFT may be performed if 1.25 MHz (75 sub-carriers) is used for the SCH and the other band is used for other purpose in the same manner as the LTE. In either case, the time corresponding to one OFDM symbol length is uniformly maintained at 66.7 us even though the number of the samples depends on each case.

Hereinafter, a method for detecting a code at a receiving side in accordance with the preferred embodiment of the present invention will be described with reference to FIG. 8B.

Referring to FIG. 8B, the receiving side removes cyclic prefix (CP) of a received signal (75) and performs fast fourier transform (FFT) (76). The result is as expressed by the following Equation 14.

$$R(k) = C_\tau^M(k)H(k) + N(k) \quad \text{[Equation 14]}$$

$$= C_{guard}^M(k) \cdot \exp\left(-j \frac{2\pi k\tau}{N_{fft}}\right) H(k) + N(k)$$

$k = 0, 1, 2, \ldots, N_{fft-1}$

The receiving side estimates the value of M of the GCL CAZAC code transmitted from the transmitting side by using the FFT result (77). The value of M can be estimated through the maximum value of IDFT value of differential encoding in accordance with the following Equation 15.

$$M' = \text{Index}\left(\max_n (IDFT(R(k-1)^* R(k)))\right) \quad \text{[Equation 15]}$$

In the Equation 15, when $(R(k-1))^* \times R(k)$ is performed, a delay component τ added intentionally by the transmitting side becomes a constant of exp(−jτ) and thus does not affect estimation of the value of M. In the Equation 15, ( )* means conjugate.

It will be apparent that maximum values are only detected during detection and some of the maximum values are selected as candidate values so as to process the selected values in parallel.

The receiving side detects the delay component τ after estimating the value of M (78). The delay component can be estimated through the following steps.

In the first step, the received signal is compensated by the GCL CAZAC sequence corresponding to M' estimated by the Equation 15, and this step can be performed by the following Equation 16.

$$R'(k)=R(k)\cdot(C^M(k))^* \qquad \text{[Equation 16]}$$

Once the first step is performed, frequency response of the channel in the frequency domain can be obtained.

In the second step, IFFT is performed for the resultant value of the Equation 16, and this step can be performed by the following Equation 17.

$$r'(n)=\text{IFFT}(R'(k)) \qquad \text{[Equation 17]}$$

Once the second step is performed, impulse response in the time domain can be obtained.

Figure 10:
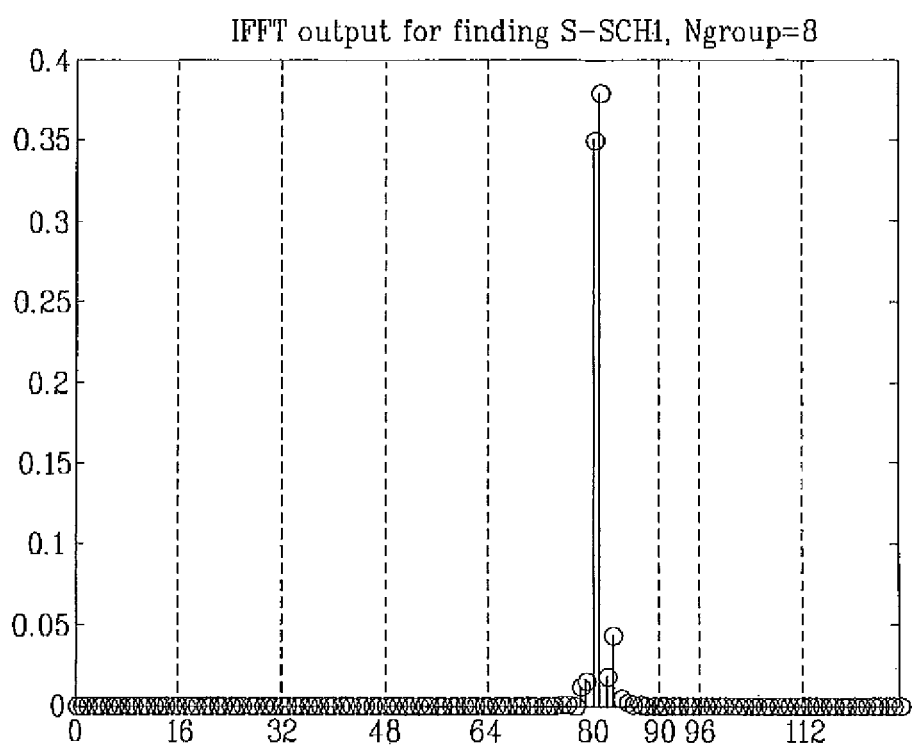
FIG. 10 is a diagram illustrating steps of the preferred embodiment of the present invention.

FIG. 10 is a diagram illustrating the resultant value after the second step is performed.

In the third step, powers within each of delay groups are added, and the group having the greatest value of the added values is selected. This step can be performed by the following Equation 18.

$$D' = \text{Indexofgroup}\left( \max_g \left( \sum_{i=0}^{N_{fft}/N_g - 1} \left| (r')^g \left( \frac{N_{fft}}{N_g} \cdot g + l \right) \right|^2 \right) \right) \qquad \text{[Equation 18]}$$

In the Equation 18, Ng means the number of groups that can generate delay, and g means group indexes (0, 1, . . . ).

Figure 11:
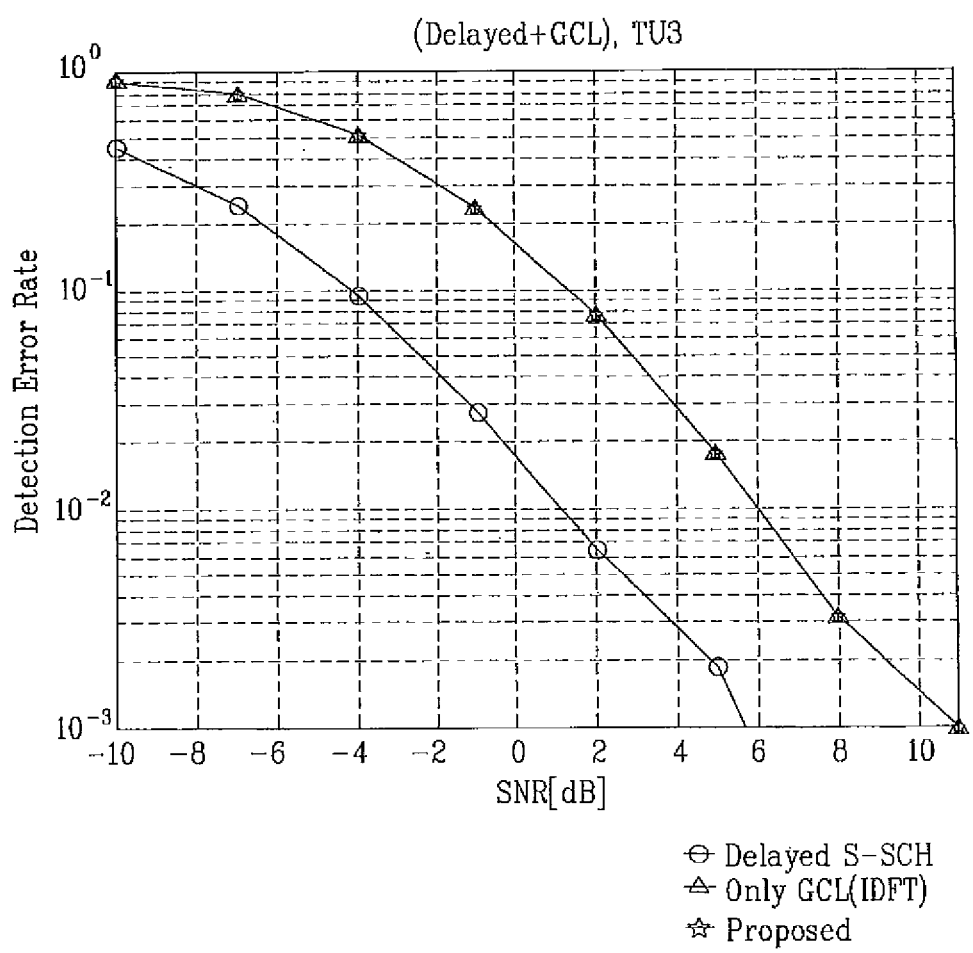
FIG. 11 is a diagram illustrating a performance curve according to the preferred embodiment of the present invention.

FIG. 11 is a diagram illustrating a performance curve according to the preferred embodiment of the present invention. Referring to FIG. 11, a detection error rate is shown under the experimental environment of the TU channel model of 3 km/h.

In FIG. 11, i) 'Delayed S-SCH' illustrates detection performance which detects the delay group only, ii) 'Only GCL(IDFT)' illustrates a performance graph when the GCL code according to the related art is only used, and iii) 'Proposed' illustrates a performance graph from the method according to the preferred embodiment of the present invention.

iii), which corresponds to the present invention, is obtained by combination of i) and ii). Since suggested overall performance depends on poorer performance of i) and ii), it depends on performance of ii). Accordingly, it is noted that overall performance is obtained almost equally to that obtained by the related art only.

It is noted that although the number of available cell IDs in case of N=75 is 40 in the related art, the number of cell IDs increases to 40×8=320 without degradation of performance in the preferred embodiment of the present invention.

In the case that two base stations use the same M and different delay values in accordance with the present invention, a user equipment detects two delay groups when two signals simultaneously reach the user equipment. To avoid this specific circumstance, a limitation that two base stations should use different values of M can be considered. In this case, although the number of cell IDs is equal to that of the related art (40), information (8 types) by means of delay can be used for other secondary information (ex., frame synchronization information).

In the hierarchical structure, initial synchronization is performed by the P-SCH, and cell ID is detected through the S-SCH. On the other hand, in the non-hierarchical structure, both initial synchronization and cell ID detection are performed through the SCH. Initial synchronization of the hierarchical structure is performed by cross correlation using a common signal which each user equipment knows as every base station transmits the common signal through the P-SCH. On the other hand, initial synchronization of the non-hierarchical structure is performed by blind detection using auto correlation through a repeated structure of OFDM signals transmitted from the SCH. Accordingly, since there is no need to know a specific signal, anything transmitted from the SCH can undergo synchronization. In this regard, in the non-hierarchical structure, cell ID information is transmitted along with the SCH. If the technical spirit according to the present invention is applied to the non-hierarchical structure, cell ID information is transmitted and received in the same method as that applied to the S-SCH in the hierarchical structure.

According to the present invention, the following advantages can be obtained.

First, it is possible to extend the range of the code sequences that can be used in the communication system.

Second, in case of the synchronization channels, secondary information that can be transmitted can be increased.

Third, it is possible to prevent codes from being decreased by multi-path.

Finally, frequency diversity effect can be obtained when the receiving side performs code estimation.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A method for transmitting a synchronization signal by a transmitting side device to a receiving side device of a mobile communication system, the method comprising:
   generating a concatenated code sequence in a frequency domain by concatenating a first code sequence having a first index ($M_1$) and a second code sequence having a second index ($M_2$), each of the first code sequence and the second code sequence including a code sequence obtained by differently circular shifting a third code sequence,
   wherein the concatenated code sequence is mapped to subcarriers belonging to a frequency band for transmitting the synchronization signal via a secondary synchronization channel (S-SCH);
   transforming the concatenated code sequence into a time domain signal; and
   transmitting the time domain signal to the receiving side device as the synchronization signal,
   wherein the concatenated code sequence indicates a cell group ID (identity).

2. The method of claim 1, wherein the first code sequence and the second code sequence are binary codes.

3. The method of claim 1, wherein transforming the concatenated code sequence into the time domain signal comprises:
   performing an invert fast Fourier transform (IFFT) for the concatenated code sequence.

4. The method of claim 1, further comprising:
   transmitting a sequence via a primary synchronization channel (P-SCH).

5. The method of claim 4, wherein the sequence transmitted via the P-SCH comprises a CAZAC sequence (Constant Amplitude Zero Auto-Correlation sequence).

6. The method of claim 1, wherein the mobile communication system provides cell IDs represented as a combination of the cell group ID and a cell ID within a cell group.

7. A transmitter for transmitting a synchronization signal to a receiving end device of a mobile communication system, the transmitter comprising:
 a sequence combiner generating a concatenated code sequence in a frequency domain by concatenating a first code sequence having a first index ($M_1$) and a second code sequence having a second index ($M_2$), each of the first code sequence and the second code sequence including a code sequence obtained by differently circular shifting a third code sequence,
 wherein the concatenated code sequence is mapped to sub-carriers belonging to a frequency band for transmitting the synchronization signal via a secondary synchronization channel (S-SCH); and
 a time domain signal transforming module transforming the concatenated code sequence into a time domain signal to be transmitted as the synchronization signal transmitted via the S-SCH,
 wherein the concatenated code sequence indicates a cell group ID (identity).

8. The transmitter of claim 7, wherein the first code sequence and the second code sequence are binary codes.

9. The transmitter of claim 7, wherein the time domain signal transforming module includes:
 an IFFT module performing an inverse fast Fourier transform (IFFT) for the concatenated code sequence.

10. The transmitter of claim 7, wherein the transmitter further transmits a sequence via a primary synchronization channel (P-SCH).

11. The transmitter of claim 10, wherein the sequence transmitted via the P-SCH comprises a CAZAC sequence (Constant Amplitude Zero Auto-Correlation sequence).

12. The transmitter of claim 7, wherein the mobile communication system provides cell IDs represented as a combination of the cell group ID and a cell ID within a cell group.

13. The method of claim 7, wherein the mobile communication system provides cell IDs represented as a combination of the cell group ID and a cell ID within a cell group.

14. A method for receiving a synchronization signal by a receiving side device from a transmitting side device of a mobile communication system, the method comprising:
 receiving a time domain signal as the synchronization signal via a secondary synchronization channel (S-SCH) from the transmitting side device,
 wherein the synchronization signal has a form of a concatenated code sequence generated by concatenating a first code sequence having a first index ($M_1$) and a second code sequence having a second index ($M_2$), each of the first code sequence and the second code sequence including a code sequence obtained by differently circular shifting a third code sequence,
 wherein the concatenated code sequence is mapped to sub-carriers belonging to a frequency band for transmitting the synchronization signal via the S-SCH;
 detecting information provided by the S-SCH, wherein the information provided by the S-SCH is represented by a combination of the first index ($M_1$) and the second index ($M_2$), and
 wherein the concatenated code sequence indicates a cell group ID (identity).

15. The method of claim 14, further comprising:
 receiving a sequence via a primary synchronization channel (P-SCH).

16. The method of claim 15, wherein the sequence received via the P-SCH comprises a CAZAC sequence (Constant Amplitude Zero Auto-Correlation sequence).

17. A receiving side device for receiving a synchronization signal from a transmitting side device of a mobile communication system, the receiving side device comprising:
 a receiver receiving a time domain signal as the synchronization signal from the transmitting side device via a secondary synchronization channel (S-SCH),
 wherein the synchronization signal has a form of a concatenated code sequence generated by concatenating a first code sequence having a first index ($M_1$) and a second code sequence having a second index ($M_2$) which is obtained by cyclic shifting the first code sequence, each of the first code sequence and the second code sequence including a code sequence obtained by differently circular shifting a third code sequence,
 wherein the concatenated code sequence is mapped to sub-carriers belonging to a frequency band for transmitting the synchronization signal via the S-SCH;
 a detector detecting information provided by the S-SCH, wherein the information provided by the S-SCH is represented by a combination of the first index ($M_1$) and the second index ($M_2$), and
 wherein the concatenated code sequence indicates a cell group ID (identity).

18. The receiving side device of claim 17, wherein the receiver further receives a sequence via a primary synchronization channel (P-SCH).

19. The receiving side device of claim 18, wherein the sequence received via the P-SCH comprises a CAZAC sequence (Constant Amplitude Zero Auto-Correlation sequence).

20. The receiving side device of claim 17, wherein the mobile communication system provides cell IDs represented as a combination of the cell group ID and a cell ID within a cell group.

* * * * *